Feb. 23, 1971     K. S. MAIER     3,564,947
TWIST DRILLS
Original Filed Jan. 16, 1964
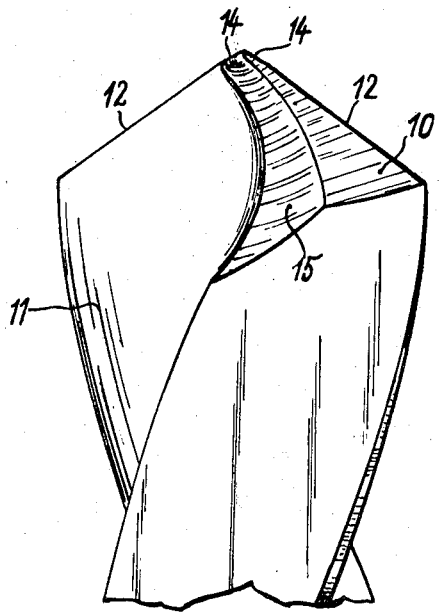
*Fig. 1*
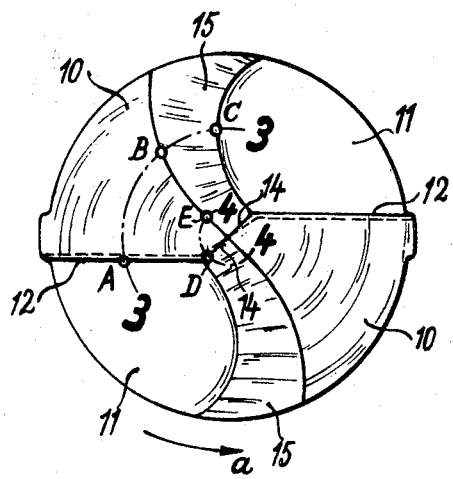
*Fig. 2*
*Fig. 3*
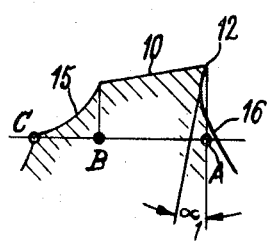
*Fig. 4*
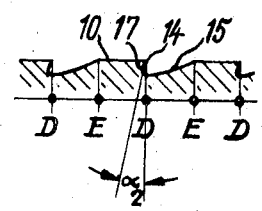
INVENTOR
Karl Stephan Maier
BY
Michael J. Striker
ATTORNEY United States Patent Office 3,564,947
Patented Feb. 23, 1971

3,564,947
TWIST DRILLS
Karl Stephan Maier, Weinbrennerstrasse 20,
Karlsruhe, Baden, Germany
Application Apr. 26, 1967, Ser. No. 634,007, which is a continuation of application Ser. No. 338,103, Jan. 16, 1964. Divided and this application May 17, 1968, Ser. No. 738,366
Int. Cl. B23b 51/02
U.S. Cl. 77—70
3 Claims

ABSTRACT OF THE DISCLOSURE

A twist drill providing a good centering action and comprising at least two cutting lips which are connected together by centering lips, in which the cutting lips are followed, in the direction of rotation of the drill, by a main land of the drill and by a further ground surface of greater rake than the main land. Each centering lip dividing the main land following one cutting lip from the further ground surface following the opposite cutting lip, and each centering lip being undercut by the respective further ground surface which it meets and thus being provided with a positive cutting angle.

---

The present application is a division of my U.S. patent application Ser. No. 634,007 filed Apr. 26, 1967 and now abandoned which, in turn, is a continuation of my U.S. patent application Ser. No. 338,103 filed on Jan. 16, 1964 and now abandoned.

The invention relates to twist drills and to a method of and device for forming same.

The usual kind of twist drill has, in the region of its point, on the axis of the drill, a chisel-edge running at angles to the drill axis and forming a straight transverse edge, connecting together diagonally the main cutting lips, which lie on the surface of a truncated cone in offset parallel planes.

A chisel edge of this sort does not allow the drill to penetrate quietly into the material being drilled. The drill chatters, does not centralize itself properly and easily runs off sideways. The drilled hole is unround, unclean and not to correct dimensions. Moreover, due to the high axial thrust required, a considerable risk of fracture arises, with excessive wastage of drills. To obtain a reasonably good centering of the drill, it is necessary to centre punch first, to give the correct drilling axis.

With these transverse chisel-edges, there is a further risk, apart from the dimensional irregularities mentioned above, that the corners of the drill may break off and the drill may fracture in the middle.

A further disadvantage of the usual chisel-edge is that its cutting lips have negative cutting angles (i.e. each cutting face slopes away from the cutting lip). With negative cutting angles, the material being drilled is squashed and, having no way of escape, becomes crushed in place, resulting in extra loading of the drill and machine.

To keep the axial thrust within reasonable bounds, the main lands of the drill, following the cutting lips of the drill, may be provided with only a relatively small rake. This considerably reduces the cutting lip angle, with resulting danger of fracture of the cutting lip.

Other twist drills have been proposed having the chisel-edge ground shorter (web thinning), by grinding a second surface between the cutting lips and chisel-edge but this simultaneously shortens the cutting lips and the chisel-edge is separated from the cutting lip by this second ground surface. This design of drill, with its shorter chisel-edge, gives better centering, but the strength of the drill point is considerably impaired and fracture can easily occur at the weakened places.

Yet further twist drills may be formed by a circular grinding operation, giving a chisel-edge which is convex shape in side elevation and is S-shape in plan view. Although this does give improved centering, the material is still squashed during the drilling operation with resulting heavy wear on the drill.

Other twist drills have been proposed with main cutting lips in parallel planes and having centering lips connecting together the main cutting lips, whereby the main lands behind the main cutting lips are "relief-ground" as far as the drill axis. In this case the centering lips lie on a cone whose apex is on the drill axis. This kind of twist drill does provide a good centering action, but the axial thrust required is still rather high because the centering lips do not play a part in the cutting action. Their action is merely a thrusting or squashing action.

According to the present invention there is provided a twist drill comprising at least two cutting lips which are connected together by centering lips, each cutting lip being followed, in the direction of rotation of said drill, by a main land of the drill and by a further ground surface of greater rake than the main land, each centering lip dividing the main land following one cutting lip from the further ground surface following the opposite cutting lip, each centering lip being undercut by the respective further ground surface which it meets and thus being provided with a positive cutting angle. Preferably there are two cutting lips situated in offset parallel planes. Preferably the cutting lips are also undercut and are thus provided with positive cutting angles.

The twist drill of the present invention has a good centering action and also very efficient drilling with relatively little axial thrust being required. Due to the centering lips provided, the drill penetrates relatively quietly into material with a good centering action, producing accurately round and correctly dimensioned holes with little or no tendency to run away sideways. The positive cutting angle allows the centering lips to take part in the drilling action as active cutters. Squashing of the material, which is often obtained with negative cutting angles, is avoided and a relatively small axial thrust is required to give a reasonable rate of drilling. Moreover, there is much less risk of breaking the drill than there is with drills of conventional form.

The drilling thrust, acting on the parts of the centering lips which are steeply inclined towards each other, thrusts them centrally against each other and thus gives them extra support against fracture of the lips, diminishing the risk of the drill splitting at the centre. The cutting angle of the centering lips includes a spiral hollow passage leading to the flutes and this has the effect of promoting easy removal of the chips produced by the centering lips.

As the centering lips are themselves cutting edges said further ground surface need be hardly more pronounced near the tip than it is at the outer periphery of the drill. This results in a considerably stronger lip angle for the main cutting lips and gives greater security against the fractures which may occur.

The "hollow ground" lips produced ensure, in addition to the advantages already mentioned, that the chips or shavings, which already originate at an angle, are caused to roll away along the curved channel formed along the lands by the pressure applied from two sides of the hollow ground lips. This is preferable to previously proposed twist drills, where the land behind the cutting lip is a steeply inclined flat surface with the result that the chips tend to retain their direction of movement and are crushed and ground under the drill.

A further advantage provided by the drill point made according to the invention is that liquid coolant can reach the drill point quite readily.

The invention is illustrated, merely by way of example, in the accompanying drawings, in which:

FIG. 1 is an elevation of a twist drill according to the present invention,

FIG. 2 is a plan view of the twist drill shown in FIG. 1,

FIG. 3 is a development of a section of the drill of FIG. 2, and taken on line 3—3 of FIG. 2, FIG. 4 is a development of a section of the drill of FIG. 2, taken on line 4—4 of FIG. 2.

Referring to FIGS. 1 to 4, there is shown a twist drill according to the present invention. Lands 10 of the twist drill are separated from each other by spiral flutes 11. The lands 10 are provided at their forward edges, that is to say in the direction of rotation of the drill (as shown by the arrow $a$) by principal cutting lips 12. FIG. 2 shows how these main cutting lips 12 lie in offset planes parallel to each other, and are connected to each other by centering lips 14 which, as shown in side elevation in FIG. 1, meet at the point of the drill. The included angle of the centering lips 14 is larger than the included angle of the truncated cone containing the main cutting lips 12.

Each cutting lip 12 is followed by a land 10 and then by a further ground surface 15, which has a rake larger than that of the land 10 (see FIG. 3). Centering lips 14 divide each land 10 from the opposite surface 15, as clearly seen in FIG. 2.

FIG. 3 shows how each cutting lip 12 is undercut to provide it with a positive cutting angle $\alpha 1$. FIG. 4 illustrates how each centering lip 14 is also undercut (or "hollow-ground") at the surface 15, to provide it with a positive cutting angle $\alpha 2$ shown at 17.

What is claimed is:

1. A twist drill adapted to be rotated in one direction about its axis and comprising at least two main cutting lips extending inclined to said axis and having inner ends spaced from said axis; at least two centering lips respectively extending from said inner ends of said main cutting lips and intersecting each other at a point of said axis, the included angle between said centering lips being greater than the included angle of a cone surface containing said main cutting lips; at least two lands respectively extending in circumferential direction from said main cutting lips in a direction opposite to the direction of rotation of the drill and in radial direction from the centering lips extending from the respective main cutting lip to the outer periphery of the drill; and at least two spirally wound surfaces each following a respective one of said lands in direction of the rotation of the drill and intersecting the respective one of said lands along a curve passing through said point of intersection of said centering lips, each of said spirally wound surfaces extending from the periphery of said drill up to that centering lip which is located laterally of the respective land and each of the spirally wound surfaces undercutting said centering lip to provide at the latter a positive cutting angle.

2. A twist drill as defined in claim 1, wherein said two cutting lips are situated in offset parallel planes.

3. A twist drill as defined in claim 1, wherein said two cutting lips are provided with positive cutting angles.

References Cited

UNITED STATES PATENTS 2,328,629   9/1943   Eich _____ 77—70X

FRANCIS S. HUSAR, Primary Examiner

U.S. Cl. X.R.

51—219; 145—117